April 8, 1930. E. J. SWEETLAND 1,753,277
PREPARED AUTOMOTIVE ENGINE FILTER CLOTHING
Filed Dec. 6, 1923
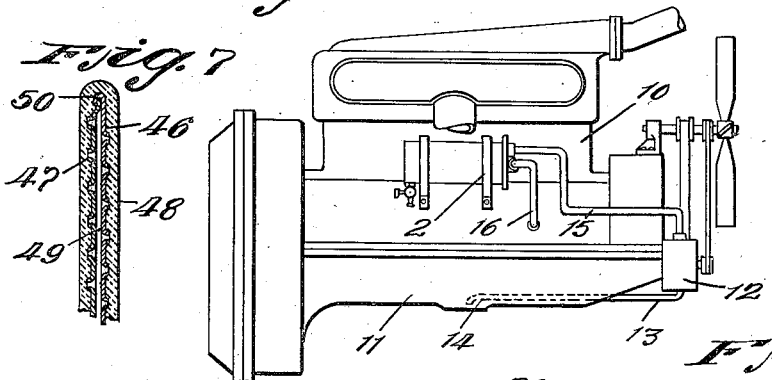
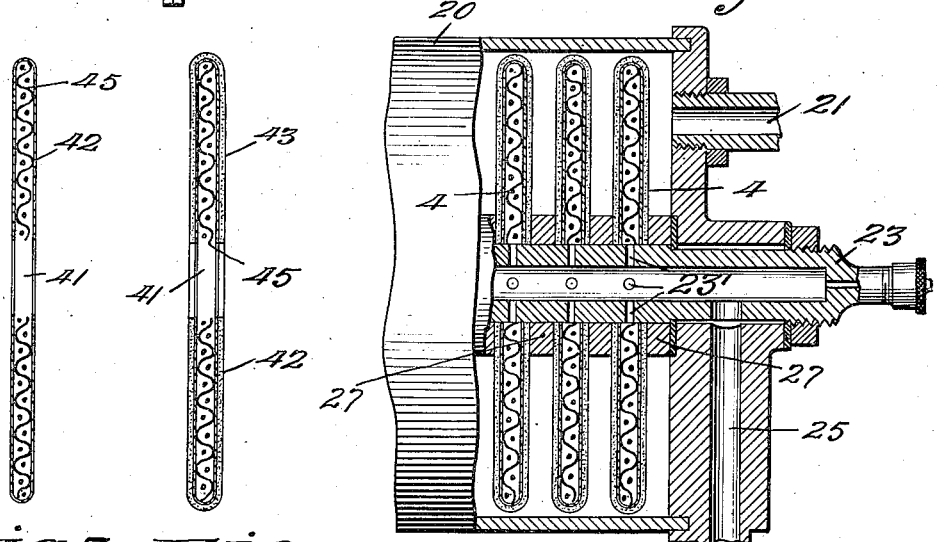
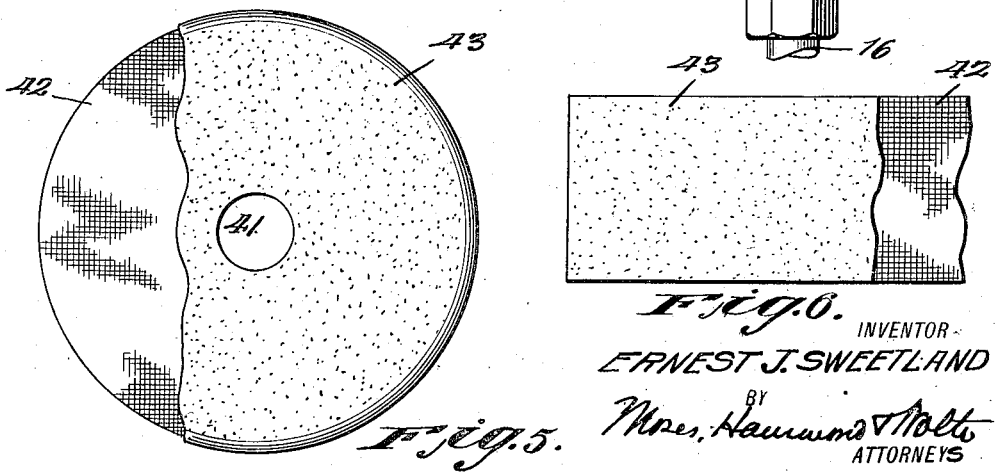
INVENTOR
ERNEST J. SWEETLAND
ATTORNEYS Patented Apr. 8, 1930

1,753,277

UNITED STATES PATENT OFFICE

ERNEST J. SWEETLAND, OF HAZLETON, PENNSYLVANIA

PREPARED AUTOMOTIVE-ENGINE FILTER CLOTHING

Application filed December 6, 1923. Serial No. 678,897.

This invention relates to improvements in filters for internal combustion engine lubricating systems, and more especially to a prepared filter fabric for use in connection with automotive lubricating systems.

In the preparation of filters for the lubricating systems of internal combustion engines, it has heretofore been my custom to insert a relatively porous filter fabric or element into the lubricating system and force the oil through the same until a filter or slime bed is formed upon the surface thereof by the coarser suspended particles before the filter will operate with maximum efficiency to remove the finer suspended particles from the oil. In lieu of waiting for the formation of the filter or slime bed from the impurities in the oil it has been my custom in some instances to insert a filter dressing, such as kieselguhr, for example, into the lubricating system and allow the circulation of the oil to deposit it as a filter bed upon the filter elements, so as to insure complete removal of the suspended impurities in the oil after the filter bed is formed.

It is an object of this invention to provide a filter fabric or element carrying a preformed filter bed which may be installed in the filter with a minimum of labor, inconvenience and time, and which will operate initially with maximum efficiency to remove the finest suspended impurities from the moment it is installed.

It is another object of this invention to provide a prepared filter fabric carrying a preformed filter bed.

A further object is to prepare upon a filter fabric a filtering bed of such quality that particles of water as well as finely divided suspended solids will be removed from the crank case oil during filtration.

By the methods herein described, I may prepare a filter cloth before the fabric is cut and sown into filter elements, and thus facilitate the manufacture of the complete filter units, or the filter bed may be formed upon the filter elements after they have been cut and sown into shape and had the drainage member placed within said elements, but before the elements are installed in the filter. Either one of these methods particularly facilitates the preparation of a suitable filter surface during the manufacture of the complete filter unit where the casing of such unit is permanently closed and sealed by folding and pressing or soldering the metal parts of the casing together, because in such construction the interior of the filter casing including the filter element is not accessible when the casing is once sealed during the manufacturing process.

It is a further object of this invention to provide a prepared filter fabric which may be readily transported in a small compact space, which may be manufactured and sold as a standard article of commerce in sizes suited to the various engine lubricating systems, and which is adapted to be applied to such systems without further preparation and without the requirement of any particular skill or judgment on the part of the person using it.

This application forms a continuation in part, of the application of Ernest J. Sweetland, Serial No. 393,807, filed July 3, 1920.

Great difficulty has been experienced in obtaining a filtering medium which would successfully remove the finer impurities, such as carbon particles, from the lubricating oil and would still be of such nature as to be readily removable for cleaning and replacement. The screens and strainers used heretofore were easily removable but not capable of filtering out the very fine or minute contaminating suspended substances. Filter beds formed by use of specially prepared filter aids, precipitated on a porous base from clean oil, as disclosed in Sweetland's application, Serial No. 393,950, have proved most effective for filtering purposes and have successfully filtered out the finest suspended impurities. But this requires that the filter bed be formed after the filter is assembled and the filter closed. It is a feature of my present invention to form a prepared filter bed wherein an insoluble filter aid is caused to adhere to a porous base before the filter is inserted in the lubricating system in such a manner that the simple insertion of the prepared fabric in the filter casing is all that is necessary to prepare the filter for operation at maximum efficiency.

Other objects and advantages will appear as the description proceeds.

Like numerals indicate like parts through the several views of the accompanying drawings, in which—

Fig. 1 is a perspective view showing the application of my filtering system to the lubricating system of an automobile engine.

Fig. 2 is a part sectional view of the filter and casing shown in Fig. 1.

Fig. 3 is a sectional view of one form of filter element before the filter aid has been applied.

Fig. 4 is a sectional view of a complete prepared filter element.

Fig. 5 is an elevation of a filter element with a portion of the filter aid removed to more clearly show the construction.

Fig. 6 is an elevation of prepared filter fabric or clothing, with a portion of the filter aid omitted to show the base cloth.

Fig. 7 is a view of a modified form of filter element.

Referring to Fig. 1, the filter casing is mounted on an internal combustion engine 10 of any suitable type, having a crank case 11 which contains the oil for lubricating the moving parts of the engine. Mounted upon the engine or upon the vehicle frame, is a pump 12, provided with an intake 13 extending within the crank case 11, and having its open end positioned adjacent the bottom of the crank case, preferably within a depression 14, formed in the bottom thereof. The pump 12 is provided with a discharge pipe 15, leading to the filter 2, from which the filtered oil is discharged to the bearings of engine 10 through pipe 16.

Fig. 2 discloses a partial section of the filter 2, which comprises casing 20, an intake pipe 21, discharging oil from the pipe 15 into casing and filter elements 4, mounted upon the hollow drainage conduit 23 which communicates with the discharge pipe 16, through suitable ports 25. The filter elements 4 are provided with a central hole 41 large enough to slip on the conduit 23 and spacers 27 separate the elements 4 and register the interior of these elements with the drainage openings 23' in the conduit. It will be understood that this represents only one method of mounting filter elements and that this method can be considered illustrative only, as any other method of mounting which presents the improved filter bed to a liquid to be filtered on one of its sides and to a drainage space on the other side, will serve equally well.

The filter element 4, consists of a porous base 42, preferably of cloth which is covered with a filter aid 43, capable of filtering out the fine suspended particles. The porous base 42 may be covered with the filter aid 43 by treating the same with kieselguhr in suspension and allowing the liquid to drain off, leaving the insoluble filter aid 43 deposited upon the surface of the porous base 42.

It has been found preferable when using a cloth base to use cloth having a liberal amount of nap on its surface, such as flannel or felt, as this nap greatly increases the bonding between the filter aid 43 and the base 42.

It is often advantageous to assist the depositing of the filter aid by applying suction to one side of the filter cloth while it is submerged in the liquid containing the filter aid. This method is especially advantageous in such cases as the filter elements 4, which are built up of a screen core or drainage member 45 which is covered with the porous base fabric 42 as indicated in Fig. 3. In depositing the filter aid by suction, the fabric-covered core is mounted on suitable conduit which is connected to a convenient source of suction and the fabric-covered core is then submerged in the liquid which contains the filter aid, whereupon an even deposit 43 is rapidly formed on the fabric.

Another method which I might employ of depositing the filter aid upon the surface of the cloth is as follows: One or more filter elements built with drainage member 45 covered with filter fabric 42 may be mounted upon a perforated shaft such as is designated by the numeral 23 of Figure 2, and this shaft temporarily inserted in a fluid tight casing. A fluid containing the filter aid to be deposited is then forced into the casing under pressure and while filtration progresses the filter aid is deposited upon the surface of the cloth in an even layer while the clarified fluid which was used as a vehicle for the filter aid is discharged from the center of the shaft to be again mixed with filter aid and reused. This results in a satisfactory deposit upon the cloth surface as indicated in Fig. 4. After the required amount of filter aid has been deposited the surplus fluid may be removed by blowing air thru the filter elements or by natural evaporation or by forced evaporation with the aid of heat. When this method is employed the fluid used as a vehicle for the filter aid may be oil or it may be water containing a small amount of glue or glycerine, or other material which acts as a binder or adhesive to hold the filter aid in place on the elements.

The completed element 4 may then be allowed to drain and can be immediately used in a filter or packed in a suitable container for transport and sale for use in the filter casings.

The prepared filter fabric may also be made by treating the fabric used as a base in rolls in such manner as to form a layer of filter aid on the surface of the cloth before it is made up into filter elements, producing the result indicated in Fig. 6 wherein the numeral 42 indicates the fabric and 43 the coating of filter aid. In effect, this amounts to nonmetallic filter fabric such as canvas, duck, felt, muslin, canton flannel or the like which has been sized with a material capable of aiding filtration, and any of the commercial methods of sizing cloth may be employed within the spirit of this invention so long as the sizing material includes a substance capable of aiding filtration. Whatever method is employed in preparation of the material, the fabric when ready for the market is a complete product ready for use in any type of filter without further preparation or treatment and capable of filtering out the fine suspended particles with maximum efficiency. The sizing material, including the filter aid may be applied to the yarn before weaving into fabric if desired.

The dipping method hereinbefore described is not essential to the preparation of the fabric as the cloth may be moistened with oil, glycerine, shellac, varnish or glue and the filter aid applied dry by dusting it on in powder form. Another method of applying the filter aid to the fabric contemplated by this invention is to apply the filter aid suspended in the liquid as before, as a sizing, by spraying or brushing it on the fabric. The liquid used may be of a viscous nature as when partially composed of glue. The filter aid employed may be kieselguhr or other materials, such as bonechar, finely ground filtering carbons, "filtercel", fuller's earth, paper pulp, wood pulp, asbestos, fibers, or aluminum hydroxide.

It will be understood that the invention is not limited to the specific materials disclosed, or the method of applying the same to the base, but comprehends broadly a filtering element adapted to operate at maximum efficiency to filter out the finely divided particles the moment it is inserted in the filter, regardless of the method or materials by which it is formed.

Another effective method of preparing the fabric where canton flannel is used as the base, is to apply dry kieselguhr to the nap side of the cloth and thoroughly brush or rub the same into the fabric. I have found that ordinary dry canton flannel has the property of retaining a surprisingly large quantity of dry kieselguhr without the use of any binder whatever and that under the right conditions the kieselguhr works all the way through the cloth and will remain there through all ordinary handling and shipping that will be required.

If metal cloth is used in lieu of the textile fabric 42, I have found it desirable to mix the particular filter aid used with plaster of Paris or to use plaster of Paris alone to form the dressing or filter bed.

In certain cases where the cost of metal cloth may be prohibitive, I may use as a foundation for the filter dressing a thin sheet of perforated metal 46, such as tin plate or thin sheet iron. In this case, the perforations are pricked with a sharp pointed punch which forms a burr 47, on one side of the metal. In the natural process of perforating, this burr curls up to form a rough irregular surface similar to that of a nutmeg grater, and such a surface is ideal for holding the filter bed 48 firmly in place, especially when cement of an earthy character such as plaster of Paris or Portland cement is used as a binder for the kieselguhr or other material used to promote speed of filtration. In fact, where a very fine grain filter element is desired, plaster of Paris alone when formed on perforated metal as described may serve the purpose. The plates 46 are shaped as illustrated so as to provide a drainage passage 49 between the same and may be secured together by the folded edge 50 or in any other manner as by soldering, riveting or the like.

Various modifications and changes in size and shape may be resorted to without departing from the spirit of the invention or the scope of the accompanying claims which are intended to cover the prepared filter element broadly regardless of the materials used therein or the method by which it is formed.

What I claim is:

1. A prepared filter, for use with an internal combustion engine, comprising a filter element having a preformed bed of filter aid rubbed into the filtering surface thereof.

2. As an article of manufacture, a filter cloth consisting of a long nap cloth and a filter aid, consisting of kieselguhr and a suitable binder rubbed into the nap side thereof.

3. As an article of manufacture, a filter cloth consisting of canton flannel with dry powdered kieselguhr rubbed into the nap side thereof to form a filter bed.

4. A prepared filter medium which comprises a fabric having a long nap, a pulverulent filter aid intimately intermingled in a dry state with and held in place upon the surface of said fabric by said nap.

5. A filter medium for use in the oil circulatory system of automotive internal combustion engines which comprises a fabric having a fibrous nap at least equal in length to the thickness of the filter fabric, a pulverulent filter aid intermingled in a dry state with and permanently secured to the surface of said fabric by said nap.

6. A filter element comprising a fabric with a preformed filter bed permanently attached to the surface of said fabric by the binding effect of a fibrous nap formed integral with said fabric on a filter aid in a dry state.

7. A filter element comprising a drainage member, a long nap fabric filter medium, and a coating of filter aid permanently attached to and secured to said fabric in a dry state by means of a nap formed integral with said fabric.

8. An article of manufacture comprising a flexible filter fabric having a nap integral with the fabric which forms a flexible bonding agent and pulverulent filter aid intermingled in a dry state with and secured to the surface of said fabric by said bonding agent.

9. An article of manufacture comprising a flexible filter fabric having a nap integral with the fabric which forms a flexible bonding agent and kieselguhr intermingled in a dry state with and secured to the surface of said fabric by said bonding agent.

10. A prepared filter, for use with an internal combustion engine, comprising a filter element having a preformed bed of filter aid intermingled in a dry state with the filtering surface thereof.

In testimony whereof I have affixed my signature to this specification.

ERNEST J. SWEETLAND.